United States Patent [19]
Yamaguchi et al.

[11] 3,759,918
[45] Sept. 18, 1973

[54] PROCESS FOR PREPARING ETHYLENE COPOLYMER
[75] Inventors: Kazuo Yamaguchi; Masayoshi Hasuo; Isao Ito, all of Tokyo, Japan
[73] Assignee: Mitsubishi Chemical Industries, Ltd., Tokyo, Japan
[22] Filed: Dec. 3, 1971
[21] Appl. No.: 204,747

[30] Foreign Application Priority Data
Dec. 15, 1970 Japan............................. 45/112258

[52] U.S. Cl......... 260/80.7, 260/80.78, 260/88.2 R, 260/94.9 D, 260/94.9 E
[51] Int. Cl........................... C08f 15/40, C08f 1/54
[58] Field of Search ................. 260/94.9 D, 94.9 E, 260/88.2 R, 80.78

[56] References Cited
UNITED STATES PATENTS
3,629,216  12/1971  Iwasaki et al................. 260/94.9 D
3,081,286  3/1963  McKinnis...................... 260/94.9 D OTHER PUBLICATIONS
Encyclopedia of Polymer Science and Technology, Vol. 3, pp. 667–669, Interscience, New York (1965).
Encyclopedia of Polymer Science and Technology, Vol. 7, pp. 266–282, Interscience, New York (1967).

*Primary Examiner*—Joseph L. Schofer
*Assistant Examiner*—Alan Holler
*Attorney*—Norman F. Oblon et al.

[57] ABSTRACT

Ethylene copolymers having high Environmental Stress Cracking Resistance, which is especially useful for blow-molding, is prepared by copolymerizing ethylene with at least one α-olefin, in the presence of a catalyst system comprising:(1) chromium oxide supported on silica or silica-alumina having an average pore diameter or 150–10A and (2) pentaalkyl-siloxyalane or dihydrocarbyl aluminum hydrocarbonoxide.

7 Claims, No Drawings

PROCESS FOR PREPARING ETHYLENE COPOLYMER

BACKGROUND OF THE INVENTION

1. Field of the Invention

This invention relates to a process for preparing ethylene copolymers characterized by high Environmental Stress Cracking Resistances, which are useful for blow-molding.

2. Description of the Prior Art

There are numerous well recognized difficulties which can be encountered during the preparation and processing of polyolefin materials. For instance, chromium oxide, supported on a carrier such as silica, alumina, silica-alumina, zirconia, thoria or the like, is a well known catalyst system for the polymerization of olefins, particularly for the polymerization of ethylene. However, this catalyst system is very significantly temperature dependent, such that the average molecular weight of the resulting polymer, will usually be dependent upon the particular polymerization temperature applied. As an example of this, commercial grades of polyethylene, which are suitable for blow molding, will usually have average molecular weights in the range of 50,000 to 100,000. To produce this average molecular weight range, however, the polymerization usually must be effected within the temperature range of 100° – 200° C. Although efforts have been directed toward reducing the temperatures necessary to produce this grade of polyethylene, so far, no industrial acceptable technique has been reported which will yield good results at temperatures of less than 100° C., e.g., 80° C.

Another difficulty is that occasionally, these types of polymers will develop stress cracks, known as environmental stress cracking, which is caused by residual or externally applied stress. Stress cranking is frequently accentuated by the presence of detergents, solvents or surfactants. Hence, polymers which exhibit high resistance to environmental stress cracking may quite advantageously be used for molding of pipes, bottles, etc.

Another difficulty in processing is that the polymer should possess good high speed moldability, which is particularly true when processing ethylene homopolymer by blow molding. It is known that, in general, high speed moldability will be increased when the Parison's swelling effect in the blow molding procedure is decreased.

It would be desirable, therefore, to provide a method for forming olefin polymers which posses good resistance to environmental stress cracking, and which possess good high speed moldability.

SUMMARY OF THE INVENTION

Accordingly, it is one object of this invention to provide an ethylene copolymerization process which will yield copolymers having good high speed moldability and which will possess high resistance to environmental stress cracking.

It is another object of this invention to provide a copolymerization catalyst which will enable the production of ethylene copolymers at lower temperatures than herebefore required using conventional catalyst systems.

Still another object of this invention is to provide a process for preparing an ethylene copolymer having high resistance to environmental stress cracking in high yields of polymer per gram of catalyst, wherein the average molecular weight of the polymer can be easily controlled.

These and other objects of this invention, as will hereinafter become apparent, can be attained by copolymerizing ethylene with at least one α-olefin having more than three carbon atoms, in the presence of a catalyst system comprising: (1) chromium oxide supported on a carrier of silica or silica-alumina, having an average pore diameter of 150–10A, and (2) a pentaalkyl-siloxyalane, having the formula:

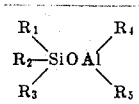

wherein $R_1$, $R_2$, $R_3$, $R_4$, and $R_5$ may each be the same or different, and each respectively represent an alkyl group, having 1 – 10 carbon atoms; or a dihydrocarbyl aluminum hydrocarbon oxide having the formula:

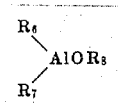

wherein $R_6$, $R_7$, and $R_8$ are each the same or different, and each respectively represent a hydrocarbon group having 1 – 14 carbon atoms.

DETAILED DESCRIPTION OF THE PREFERRED EMBODIMENTS

It has been found that the two component catalyst system comprising a supported chromium oxide, and pentaalkyl-siloxyalane or dihydrocarbyl aluminum hydrocarbon oxide, possesses an unexpectedly high polymerization activity, as compared with the use of supported chromium oxide. alone, in the polymerization of ethylene. When using the two component system, a greater degree of molecular weight control is possible and polymers having average molecular weights of 50,000 – 100,000 can effectively be prepared. The supported chromium oxide is prepared using silica or silica-alumina specimens have an average pore diameter of less than 150A, so that commercially available porous silica and silica-alumina can be effectively used. If the average pore diameter is above 150A, the ethylene copolymers produced with the catalyst will be characterized by a low resistance to environmental stress cracking.

The average pore diameter is obtained by:

$L = 4 V_g/S$ wherein L represents the average pore diameter, Vg represents the total pore volume, S represents the total surface area. The total surface area is measured by the BET method, and the total pore volume is measured by a porosimeter, such as Porosimeter Model 70 manufactured by Carlo Erba Corporation. The total surface area is measured by the three point BET method of nitrogen adsorption, using Sorptometer Model 212D manufactured by Perkin Elmer Corporation, wherein helium is used as a carrier gas and the temperature for cooling is the liquid nitrogen temperature.

The supported chromium oxide component is prepared by dipping, distilling, subliming or by otherwise applying, a suitable chromium compound onto a silica or silica-alumina carrier. The combination is then calcined to reduce the chromium compound to chromium oxide, thereby activating the catalyst. Suitable chromium compounds include the chromium oxides, halides, oxyhalides, phosphates, sulfates, oxalates, alcoholates, or organo-chromium compounds. Particularly preferred are chromium trioxide, aceto-acetyl chromate, chromium sulfate or t-butyl chromate.

Calcination activation of the chromium compound-carrier combination is usually effected in the presence of oxygen. However, it may equally be accomplished in an inert atmosphere or in a partial vacuum. This procedure is accomplished at temperatures of from 300 - 1,100° C., and preferably 400 - 1,000° C., for several minutes to several tens of hours, and especially 10 minutes to 10 hours.

The pentaalkyl siloxyalane, used as the second component, has the formula:

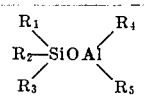

wherein $R_1$, $R_2$, $R_3$, $R_4$, and $R_5$ may each be the same or different and each may respectively represent an alkyl group of 1 – 10 carbon atoms, which includes such compounds as pentamethyl siloxyalane, pentaethyl siloxyalane, pentabutyl siloxyalane, pentahyexyl siloxyalane, pentaoctyl siloxyalane, Si-trimethyl-Al-diethylsiloxyalane, Si-triethyl-Al-dimethylsiloxyalane, Si-triethyl-Al-dibutylsiloxyalane, and Si-tributyl-Al-diethyl-siloxyalane.

It is especially effective to use a pentaalkylsiloxyalane having lower alkyl groups, such as pentamethylsiloxyalane and Si-trimethyl-Al-diethylsiloxyalane.

The pentaalkyl siloxyalane can usually be prepared by the process shown in the following reaction:

$(R)_3 SiOAlX_2 + 2MR \rightarrow (R)_3SiOAl(R)_2 + 2MX$ (1)

$(R)_3 SiOM + XAl(R)_2 \rightarrow (R)_3 SiOAl(R)_2 + MX$ (2)

wherein R represents an alkyl group of from 1 – 10 carbon atoms; and M represents an alkali metal; and X represents a halogen atom. (Referring to *Journal Of Organo-metallic Chemistry*, Vol. 1, Page 28, 1963.)

The pentaalkyl siloxyalane may also be prepared by the process shown in the following reaction:

$(R)_3 SiOH + Al(R)_3 \rightarrow (R)_3 SiOAl(R)_2 + RH$ (3)

wherein R represents an alkyl group of from 1 – 10 carbon atoms.

These pentaalkyl siloxyalanes are solid at room temperature, are usually not self-ignitable in air, and hence are easily handleable and are soluble in conventional hydrocarbon solvents.

The dihydrocarbyl aluminum hydrocarbon oxides alternatively used as the second component, are those having the formula:

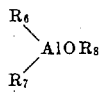

wherein $R_6$, $R_7$, and $R_8$ may each be the same or different and each may respectively represent a hydrocarbon group, preferably a hydrocarbon group having 1 – 14 carbon atoms.

The hydrocarbon group may be an alkyl group, such as methyl, ethyl, propyl, isobutyl, hexyl, 2-methylpentyl, octyl, decyl, and dodecyl; an alicyclic group, such as cyclohexyl an cyclohexylmethyl; an aryl group, such as phenyl and napthyl; or an aralkyl group such as benzyl. Typical compounds falling within this formula are, for example, methoxy-diethyl-aluminum, ethoxy-diethyl-aluminum, diethyl-aluminum-phenolate, etc. These compounds can easily be prepared by conventional processes, such as by the reaction of trialkyl aluminum and an alcohol.

The two components of the catalyst system are selected, in general, according to the particular reaction conditions. Preferably, however, they are used in ratios of 0.01 – 500:1, and especially 0.1–50:1 of Si/Cr or Al/Cr, i.e., Si in the second component of pentaalkyl siloxyalane or Al in the dihydrocarbyl aluminum hydrocarbon oxide to chromium in the first component.

In preparing the two component catalyst system, the components are admixed usually in an inert atmosphere. The method of preparing the catalyst system is not critical and is carried out by reacting both catalyst components prior to the polymerization reaction or by introducing both components into the reaction system in the form of a mixture. These components may be introduced into the reaction system separately.

The catalyst system of this invention is used for the copolymerization of ethylene with at least one α-olefin having the formula:

$CH_2 = CH - R$ wherein R represents a hydrocarbon group of from 1 – 18 carbon atoms. The α-olefins are used in amounts of less than 50 mole percent and preferably from 0.1 – 30 mole percent. The hydrocarbon group R in the above formula may be an alkyl, aryl, aralkyl, alkaryl or cycloalkyl group. Suitable α-olefins include propylene, butene-1, pentene-1, hexene-1,4-methyl-pentene-1, octene-1, decene-1, dodecene-1, and octadecene-1.

The polymerization mixture may also include one or more diene compounds to provide unsaturated groups into the resulting polymer. Suitable diene compounds include butadiene or isoprene.

The polymerization reaction is usually carried out by dispersing the catalyst system in an inert medium and then, simultaneously or separately, feeding ehtylene and one or more α-olefins at a suitable temperature and pressure.

The concentration of the catalyst system in the inert medium is preferably 0.1–200 mg/l. of the first component and 0.01 – 100 mg/l. of the second component.

The inert medium is preferably an aliphatic hydrocarbon, such as pentane, hexane, heptane, octane, isooctane; alicyclic hydrocarbon, such as cyclopentane, cyclohexane; or an aromatic hydrocarbon, such as benzene or toluene. It is also possible to use other conventional inert solvents commonly used for polymerization reactions. Since the catalyst system will be deactivated by moisture or oxygen, it is preferable to use anhydrous and oxygen-free reactants and solvents. The copolymerization reaction is usually carried out at relatively low temperatures, such as 20° – 250° C., and especially 60° – 90° C., under relatively low pressures, such as atmospheric pressure – 100 atm., and especially atmospheric pressure –20 atm..

It is possible to easily control the average molecular weight or other physical properties of the resulting copolymer by charging hydrogen to the polymerization reaction zone. In this instance, the amount of hydrogen charged to the polymerization reaction will be dependent upon the particular conditions of polymerization, and the average molecular weight of the product desired. Good results are obtainable with less than 300 mole percent hydrogen and preferably less than 100 mole percent hydrogen based on the amount of ethylene.

It is possible to employ a slurry polymerization to prepare the polymer precipitated in a solvent at the polymerization temperature of 60° – 90° C., by feeding hydrogen in the copolymerization system of this invention. The latter polymerization method is especially preferable from the viewpoint of treatment after the polymerization. In the slurry polymerization method, the polymer can be obtained by simply filtering from the slurry of polymer and insert solvent, and drying. Accordingly, it is advantageously carried on without a step of precipitation, in comparison with the solution polymerization method.

Using the present catalyst system, the copolymerization reaction can be conducted until more than 3,000 g. of polymer per gram of supported chromium oxide results. At this level of polymerization, it becomes unnecessary to remove the catalyst from the product, which therefore eliminates complex separation procedures.

This catalyst system is characterized by high catalytic activity at high temperatures as well as at relatively lower temperatures, and its use enables easy control of the average molecular weight of the resulting polymer. Moreover, the copolymerization reaction can be easily effected at relatively lower temperatures, so that the resulting copolymer may be produced in the form of a slurry, without causing the viscosity of the slurry to increase beyond easy handleability. Accordingly, the concentration of the resulting copolymer in the slurry can be greater than 30 percent by weight, which provides a variety of industrial advantages, such as reduction in the size of the reactor equipment, and decrease in the recycling of the medium.

In accordance with the process of this invention, the resulting ethylene copolymers are generally characterized by high resistance to environmental cracking and hence are characterized by good blow-molding properties.

Having generally described the invention, a further understanding can be obtained by reference to certain specific examples which are provided herein for purposes of illustration only and are not intended to be limiting in any manner unless otherwise specified. In the following examples, the term "branching coefficient" is measured by infrared spectrum and represents the number of branched alkyl groups per 1,000 carbon atoms.

For example, methyl branches (Pendant methyl groups) are formed in the copolymers of ethylene-propylene; and ethyl branches are formed in the copolymer of ethylene-butene-1. The branching coefficient is thus shown as the number of pendant $CH_3$ groups/1,000 carbon atoms, or the number of pendant $C_2H_5$ groups/1,000 carbon atoms.

EXAMPLE 1

10 g. of silica having an average pore diameter of 81 A was placed in an aqueous solution of $CrO_3$ and then was dried at 120° C. and was further activated at 800° C. for 1 hour, to prepare the first component of the catalyst containing 1 percent of Cr component. 500 ml. of n-hexane was charged into a 1 l. autoclave, equipped with an electromagnetic stirrer; 50 mg. of said first component and 8.5 mg. of Si-trimethyl-Al-diethylsiloxyalane were charged thereto and then 1.5 kg./cm² of propylene and 8.5 kg./cm² of ethylene were fed at 80° C. to conduct a constant pressure polymerization by adding ethylene for 1 hour.

131 g. of a white powdery copolymer of ethylene-propylene having an average molecular weight of 107,000 was obtained. The copolymer of ethylene-propylene had a branching coefficient (pendant $CH_3$ group/1,000 C) of 7.5.

EXAMPLE 2

The process of Example 1 was repeated except 1.0 kg/cm² of propylene, 0.5 kg/cm² of hydrogen, and 8.5 kg/cm² of ethylene were fed at 70° C. instead of feeding 8.5 kg/cm² of ethylene and 1.5 kg/cm² or propylene.

124 g. of a white powdery copolymer of ethylene-propylene having an average molecular weight of 105,000 was obtained. The copolymer of ethylene-propylene had a branching coefficient (pendant $CH_3$ group/1,000 C) of 5.2.

EXAMPLE 3

The process of Example 1 was repeated except feeding butene-1 instead of propylene.

138 g. of a white powdery copolymer of ethylene-butene having an average molecular weight of 98,000 was obtained. The copolymer of ethylene-butene had a branching coefficient (pendant $C_2H_5$ group/1,000 C) of 3.

EXAMPLE 4

The melt index and ESCR of each copolymer obtained in Examples 1–3 was measured. The results are shown in Table I.

TABLE I

| Example | Melt Index *1 | ESCR *2 (hr.) |
|---|---|---|
| 2 | 0.20 | 720 |
| 3 | 0.21 | 680 |
| 4 | 0.23 | 810 |

*1 ASTM D-1238
*2 ASTM D-1693 (Bell Telephone method) 5 of 10 pieces are broken.

EXAMPLE 5

The process of Example 1 was repeated except using silica or silica-alumina shown in Table II, instead of silica having an average pore diameter of 81A. Various properties of the resulting copolymers were respectively measured in accordance with the method of Example 4. The results are shown in Table II.

TABLE II

| Silica | Average pore diameter (Å) | Polymerization velocity gEP/g. cat. hr. (1st comp.) | Melt index | ESCR (hr.) | Branching coefficient (pendant CH₃/ 1,000 C) |
|---|---|---|---|---|---|
| Silica A | 123 | 3,400 | 0.31 | 420 | 6.4 |
| Silica B | 80 | 3,000 | 0.20 | 680 | 7.5 |
| Silica C | 62 | 2,800 | 0.31 | 590 | 6.2 |
| Silica D | 40 | 2,200 | 0.26 | 735 | 7.1 |
| Silica-alumina | 68 | 1,050 | 0.27 | 720 | 6.8 |

REFERENCE 1

The process of Example 1 was repeated except using silica having an average pore diameter of higher than 150 A as shown in Table III, instead of silica having an average pore diameter of 81 A. The properties of the resulting copolymer were measured in accordance with Example 4. The results are shown in Table III.

TABLE III

| Silica | Average pore diameter (Å) | Polymerization velocity gEP/g. cat. hr. (1st comp.) | Melt index | ESCR | Branching coefficient (pendant CH₃/ 1,000 C) |
|---|---|---|---|---|---|
| Silica E | 182 | 36,000 | 0.25 | 105 | 7.0 |
| Silica F | 280 | 43,000 | 0.30 | 63 | 6.6 |
| Silica G | 304 | 42,000 | 0.27 | 72 | 7.1 |

EXAMPLE 6

10 g. of silica having an average pore diameter of 80 A was mixed with an aqueous solution of $CrO_3$, and was dried at 120° C. and was calcined at 800° C. for 1 hour in dry air, to activate the catalyst and to yield a first catalyst component containing 1 percent of Cr.

The second catalytic compound of $(C_2H_5)_2AlOC_2H_5$ was synthesized. Into a 1 l. autoclave, equipped with an electromagnetic stirrer, 500 ml. of purified n-hexane, 52 mg. of the first component, and 5.2 g. of the second component were charged.

The autoclave was heated to 80° C., and 2.0 kg/cm² of propylene and 8.0 kg/cm² of ethylene were fed at 80° C., to conduct a constant pressure polymerization by the addition of ethylene for 1 hour.

114 g. of a white powdery copolymer of ethylene-propylene having an average molecular weight of 101,000 was obtained. The copolymer of ethylene-propylene had a branching coefficient (pendant $CH_3/1,000$ C) of 9.2.

EXAMPLE 7

The process of Example 6 was repeated except feeding 1.5 kg/cm² of propylene, 0.5 kg/cm² of hydrogen, and 8.0 kg/cm² of ethylene at 70° C. instead of feeding 2.0 kg/cm² of propylene and 8.0 kg/cm² of ethylene.

118 g. of a white powdery copolymer having an average molecular weight of 103,000 was obtained. The copolymer of ethylene-propylene had a branching coefficient (pendant $CH_3/1,000$ C) of 7.6.

EXAMPLE 8

The process of Example 6 was repeated except 12 g. of butene-1 was fed and then ethylene was fed to provide 10 kg/cm² of ethylene, instead of feeding 2.0 kg/cm² of propylene and 8.0 cm² of ethylene.

126 g. of a white powdery copolymer of ethylene-butene having an average molecular weight of 99,000 was obtained. The copolymer of ethylene-butene had a branching coefficient (pendant $C_2H_5/1,000$ C) of 3.4.

EXAMPLE 9

Each melt index and ESCR of the copolymers obtained in Examples 6 – 8 was measured in accordance with the method of Example 4. The results are stated in Table IV.

TABLE IV

| Example | Melt Index | E.S.C.R. (hr.) |
|---|---|---|
| 6 | 0.22 | 650 |
| 7 | 0.22 | 670 |
| 8 | 0.23 | 800 |

EXAMPLE 10

The process of Example 6 was repeated except using silica or silica-alumina as shown in Table V, instead of silica having an average pore diameter of 80 A. Various properties of the copolymer were measured in accordance with the methods of Example 4. The results are shown in Table V.

TABLE V

| Silica | Average pore diameter (Å) | Polymerization velocity (gEP/g. cat. hr.) (1st comp.) | Melt index | ESCR | Branching coefficient (pendant CH₃/1,000 C) |
|---|---|---|---|---|---|
| Silica A | 123 | 3,050 | 0.30 | 380 | 8.3 |
| Silica B | 80 | 2,740 | 0.22 | 650 | 9.2 |
| Silica C | 62 | 2,420 | 0.26 | 670 | 8.0 |
| Silica D | 40 | 1,890 | 0.17 | 840 | 9.4 |
| Silica-alumina | 68 | 970 | 0.24 | 700 | 8.7 |

REFERENCE 2

The process of Example 6 was repeated except using silica having an average pore diameter of more than 150 A instead of silica having an average pore diameter of 80 A. Various properties of the copolymer were measured. The results are shown in Table VI, as measured by the method of Example 4.

TABLE VI

| Silica | Average pore diameter (Å) | Polymer speed (gEP/g. cat. hr.) | Melt index | ESCR | Branching coefficient (pendant CH₃/1,000 C) |
|---|---|---|---|---|---|
| Silica E | 175 | 3,250 | 0.31 | 112 | 8.1 |
| Silica F | 220 | 3,720 | 0.26 | 80 | 7.8 |
| Silica G | 280 | 3,870 | 0.28 | 64 | 8.6 |

Having now fully described the invention, it will be apparent to one of ordinary skill in the art that many changes and modifications can be made thereto without departing from the spirit or scope of the invention. ACCORDINGLY,

What is claimed as new and intended to be covered by letters patent is:

1. In a process for preparing a copolymer of ethylene and at least one α-olefin having at least three carbon atoms, the improvement comprising copolymerizing ethylene and an α-olefin present in amounts less than 50 mole percent in contact with a catalyst system comprising: (1) chromium oxide supported on silica or silica-alumina having an average pore diameter of 150 A – 10A and (2) pentaalkylsiloxyalane or dihydrocarbyl aluminum hydrocarbon oxide.

2. The process of claim 1, wherein said α-olefin has the formula:

$$CH_2 = CH - R$$

wherein R represents a hydrocarbon group selected from the group consisting of alkyl, aryl, aralkyl, alkaryl, and cycloalkyl group, having 1 – 18 carbon atoms.

3. The process of claim 1, wherein the supported chromium oxide component is prepared by applying a suitable chromium compound onto the support, and then calcining the mixture at 300° – 1,200° C.

4. The process of claim 1, wherein the molar ratio of the second component to the first component of the catalyst system is 0.01 – 500 : 1 based on Si in pentaalkylsiloxyalane or on Al in dihydrocarbyl aluminum hydrocarbon oxide to Cr in the first component.

5. The process of claim 1, wherein the copolymerization is conducted as a slurry copolymerization.

6. The process of claim 1, wherein the copolymerization is conducted at 20° – 250° C. under a pressure of from atmospheric pressure to 20 atm.

7. The process of claim 1, wherein the copolymerization is conducted in the presence of hydrogen.

* * * * *